March 19, 1968

A. M. ANGEL 3,373,682

TRANSACTION RECORDER FOR PRINTING ON
PRESSURE-SENSITIVE JOURNAL TAPE

Filed Jan. 17, 1966

INVENTOR.
ARTHUR M. ANGEL

BY Fraser and Bogucki

ATTORNEYS

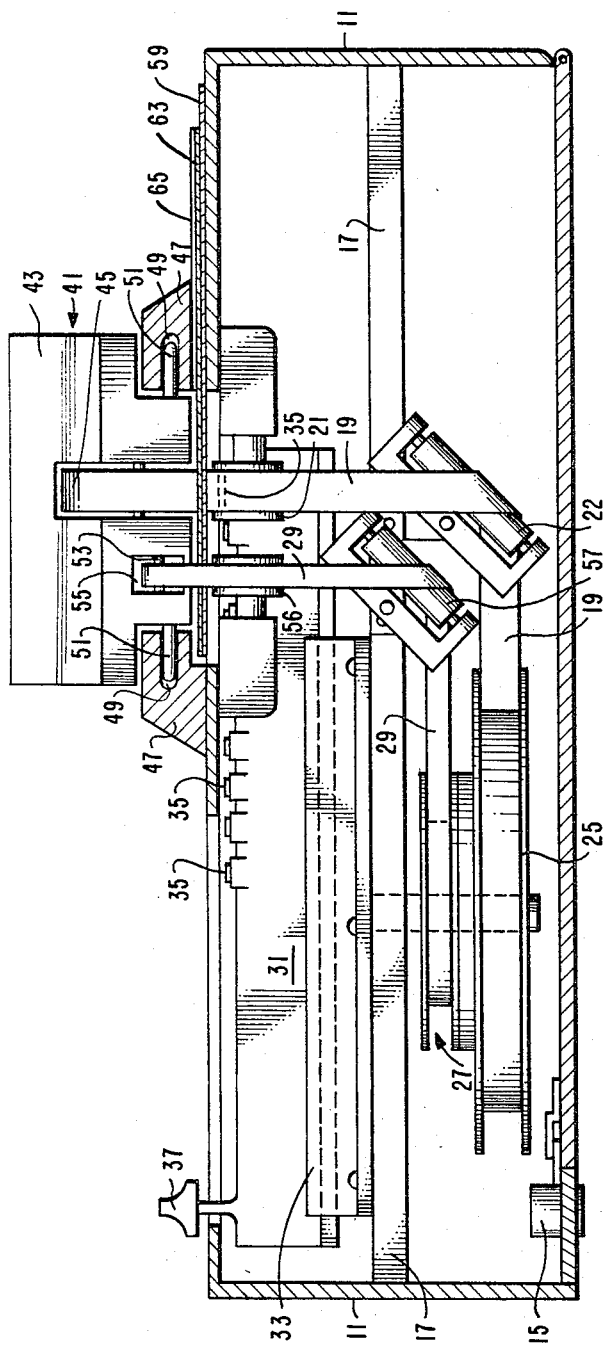
FIG. 2
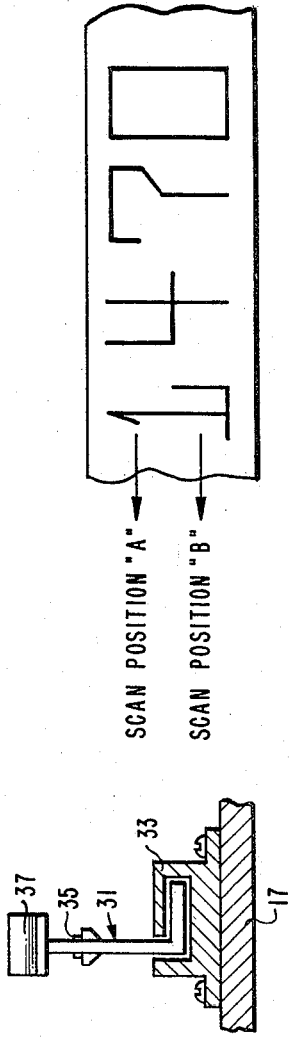
FIG. 6
FIG. 3
INVENTOR.
ARTHUR M. ANGEL
BY Fraser and Bogucki
ATTORNEYS INVENTOR.
ARTHUR M. ANGEL
BY Fraser and Bogucki
ATTORNEYS

United States Patent Office 3,373,682
Patented Mar. 19, 1968

3,373,682
TRANSACTION RECORDER FOR PRINTING ON
PRESSURE-SENSITIVE JOURNAL TAPE
Arthur M. Angel, 29 Silver Saddle Lane,
Rolling Hills Estates, Calif. 90274
Filed Jan. 17, 1966, Ser. No. 534,925
17 Claims. (Cl. 101—45)

ABSTRACT OF THE DISCLOSURE

A transaction recorder is provided in which raised indicia on movably slidable print racks are selectively positioned adjacent a pressure-sensitive journal tape and one or more other superimposed record media forms are imprinted thereon by a manually movable imprint wheel. Return of the imprint wheel after imprinting advances the journal tape for the next transaction. The imprinted characters provided by the print rack indicia are in a form that is machine readable as well as being visually readable by a clerk or customer, and the imprinted tape and record media forms may be visually verified before advancement of the tape.

---

This invention relates to business machines in general, and, more particularly, to those business machines used to record a business transaction such as a retail sale for cash or credit.

Modern business transactions can involve high activity levels and large total numbers of transactions. In a retail store, for example, hundreds or more of cash and credit transactions may be made within a particular department in a single business day. For control and accounting purposes, accurate and complete records must be kept of each transaction including such information as the sale price, tax, department, type of item, quantity, and clerk number. If a credit transaction is involved, the name, address and customer account number may additionally be required. It is generally necessary to prepare an original and one or more copies of a sales slip containing similar information, inasmuch as customers require receipts containing the essential information.

Some systems are known for entering information from embossed credit cards as well as from operator-controlled key elements. These may include specially configured indicia that are readable both visually and by machine. Such systems, however, are based primarily on unit media of the carbon paper type. That is, a separate form with integral carbons is used for each transaction. The unit media generally require an expensive optical reader for entry into data processing systems. Furthermore, the unit media must be collected and retained, and there is the possibility of subsequent alteration or loss.

The cash register is the most widely used device for recording cash transactions. A sales slip is filled out by hand, inserted into the cash register, the proper keys are engaged, and the desired price and characterizing information is recorded on the sales slip and on a journal tape within the register. A sales slip is similarly prepared for credit transactions also, generally entering customer information from an embossed card on a separate machine, and using the cash register as a final step. In some instances where a cash register is not used, necessary information is entered on a punch card receipt. Most of these methods are somewhat inefficient and require considerable time to perform. For example, typical credit transactions involve three separate forms of entry, as noted above. The most important, from the standpoint of the business establishment, is the certification step effected at the cash regitser, by which the fact and amount of the transaction are recorded in permanent form for both the establishment and the customer and retained under lock and key in the register. Because of the certification requirement, relatively simple cash and credit transactions take inordinate amounts of time to record. Because customers often select the items desired without assistance, it is common to encounter substantial delays at cash register points. Such delays obviously affect sales volume, requiring the addition of more installations or personnel if it is desired to handle transactions more rapidly. It would be preferable to utilize a different approach permitting store personnel to operate more rapidly. Adequate records for the customer and business establishment must still be provided, however, and preferably in such a manner as to effect the certification function.

Where the volume of business warrants, sales information is translated into computer language by an appropriate method such as key punching information from a sales slip or journal tape into a computer card. The translated information is then fed into data processing equipment which sorts and processes the information to derive complete accounting and inventory data very rapidly. The data translation step, however, is time consuming and subject to human error. Furthermore, errors occurring in the translation process are very difficult to locate and correct. For example, if the handwritten information on a sales slip is improperly punched on a computer card, the error may have to be traced through each stage in the data processing sequence before the sales slip is checked against the card.

It is therefore an object of this invention to provide a business machine which permits recording business transaction information accurately and efficiently.

It is a further object of this invention to provide a transaction recorder which can be accurately and efficiently used to record information from both cash and credit sales.

It is a further object of this invention to provide a transaction recorder which minimizes the number of hand-performed operations involved in recording and processing business transaction information.

It is a further object of this invention to provide a transaction recorder which permits visual verification of recorded information.

It is a further object of this invention to provide a transaction recorder in which preparation of a sales slip and certification of the information can be performed in a single operation.

It is a still further object of this invention to provide a transaction recorder from which recorded information may be automatically converted by simple means into computer language for use with data processing equipment.

The transaction recorder of the present invention is a relatively simple and inexpensive machine which solves these problems by combining the many steps involved in recording various business transactions into a few simple operations and eliminating various error-prone steps heretofore done by hand. Handwriting on sales slips can be eliminated or minimized, along with eliminating certification of a sales slip at a cash register. The clerk and customer together may read the printed sales information directly on the journal tape itself, which information is in such form that it may be automatically converted and fed into data processing equipment by extremely low cost reading equipment. This system furthermore has great versatility in offering additional features, such as the ability to operate on-line with data processing systems for data transfer or credit checking operations.

In brief, particular arrangements in accordance with the invention may comprise a transaction recorder having a plurality of character imprinters including raised font or indicia, various combinations of which can be imprinted by pressure on a journal tape and one or more other superimposed record media forms. The arrangement is such as to permit both fixed and variable information to be entered from different sources readily, with the journal tape data being readable by simple machine means. In accordance with an aspect of the invention the raised indicia are disposed on slidable print racks movable laterally relative to a pressure-sensitive journal tape, and presenting a series of characters along the length of the tape with the highest direction of the characters being normal to the tape length. An operator may thus position a desired combination of indicia representing information concerning a particular business transaction adjacent the journal tape, and concurrently insert an embossed credit card containing additional information. The tape and the various forms are preferably pressure-sensitive, to record impressions of adjacent indicia directly and simply when an imprint wheel is urged against the combination of the tape and forms. Thus both a unit record medium and a cumulative record may be prepared simultaneously and conveniently. Further, the imprinted characters are in a form that is machine readable by relatively simple and inexpensive equipment.

In accordance with other aspects of the invention, the transaction recorder may provide digital output signals and be coupled on-line to an existing data processing system for data entry or credit verification purposes.

In accordance with a further aspect of the invention, the journal tape may be advanced in increments to record each new transaction by winding the tape on a takeup reel which is controlled by a drive band arrangement, the drive band being selectively gripped so as to move with the imprint mechanism in a given direction. With the proper imprint indicia corresponding to a particular transaction positioned adjacent the tape, a simple movement of the imprint wheel by the operator records the transaction and advances the tape preparing the recorder for the next transaction.

The novel features of this invention, as well as the invention itself, both as to its organization and method of operation, may better be understood when considered in the light of the following description, when taken in connection with the accompanying drawings, in which:

FIGURE 2 is a side sectional view of the transaction recorder of FIG. 1;

FIGURE 3 is a detailed view of a print rack utilized in the arrangement of FIGS. 1 and 2;

FIGURE 6 is a simplified representation of a portion of a journal tape prepared in accordance with the invention.

Figure 1:
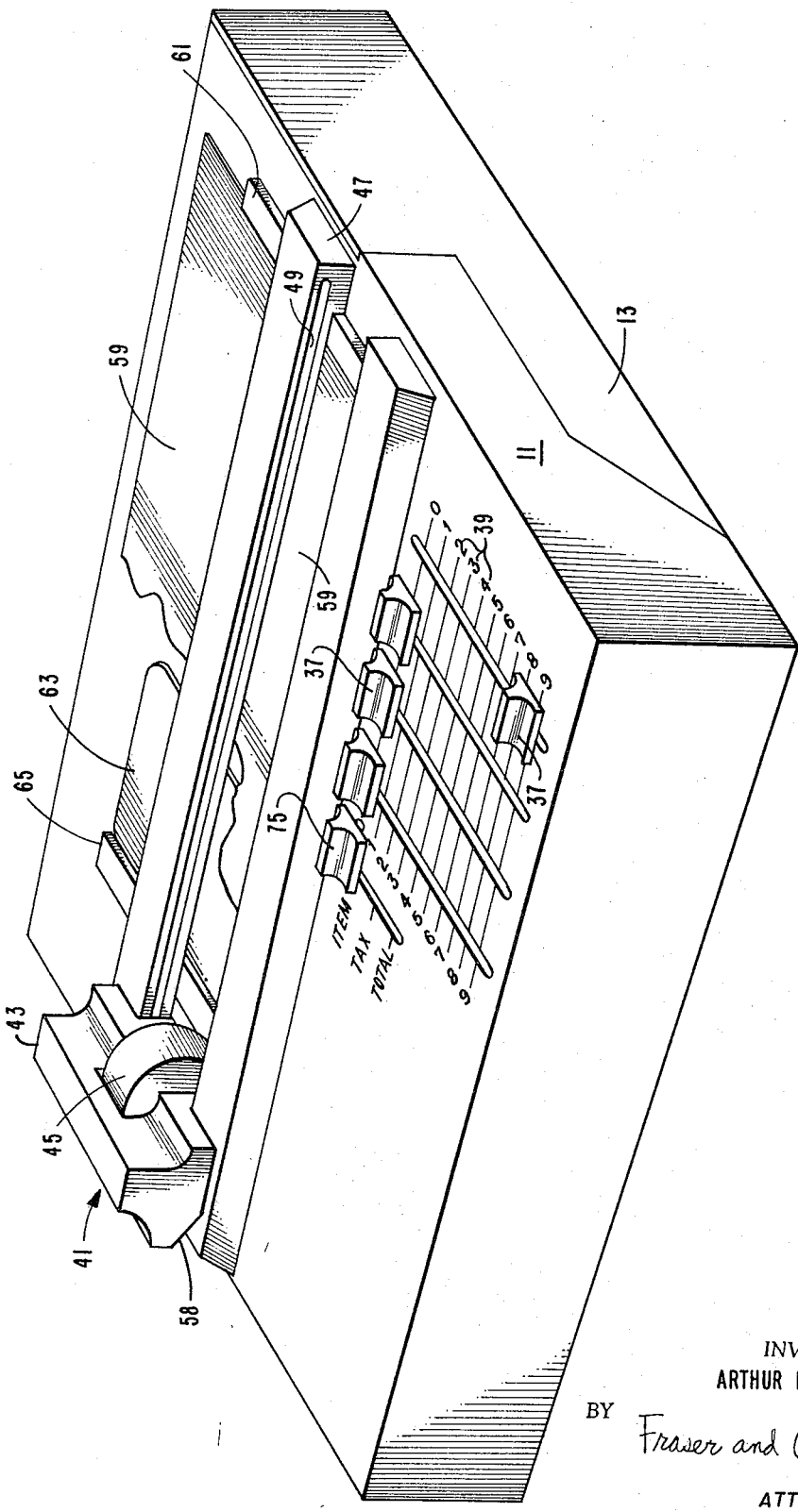
FIGURE 1 is a perspective view of a transaction recorder in accordance with the invention.

A transaction recorder in accordance with the invention, referring now to FIGS. 1–4, includes a housing 11 having a bottom cover which is hinged at the rear of the recorder and which may be opened by unlocking a lock 15 (FIG. 2) to provide controlled access to the inside of the recorder. A frame 17 mounted within the housing 11 provides a base on which the various internal components are mounted.

A journal tape 19 is guided along a longitudinal path extending across the top of the recorder from positions within the recorder by tape spindles 21 and pivotably mounted tape rollers 22 (only one each of the spindles 21 and the rollers 22 being seen in FIG. 2). The journal tape 19 is supplied from a rotatable supply reel 23 equipped with a drag clutch 24 which allows the journal tape 19 to be unwound only as needed. The opposite end of the journal tape 19 is wound onto a rotatable takeup reel 25 connected by a sprag clutch assembly 27 to an endless drive band 29. The sprag clutch assembly 27 allows the takeup reel 25 to be rotated by the drive band 29 only in the direction to wind the journal tape 19 onto the takeup reel 25.

A number of print racks 31 which are slidably mounted in and supported on rack-mounting guides 33 fastened to the frame 17 (the details of which are shown in FIG. 3) contain a plurality of raised indicia 35 which are here configured in the form of the numerals "0" through "9." As shown in FIG. 6, a typical machine readable type font is preferably employed. Taking the longitudinal direction of the tape 19 as the scan direction, each particular type symbol has its height normal to this direction. Each type symbol also varies in binary fashion at two (or more) laterally disposed positions, so as to uniquely represent each decimal digit in accordance with the following pairs of five binary digits each for the decimals shown:

Zero A—10001
   B—10001
Seven A—10001
   B—00010
Four A—00101
   B—00001
One A—00100
   B—00101

The print racks 31 are positioned by associated control buttons 37 extending from the top surface of the housing 11 alongside a number of index numerals 39. By positioning a control button 37 adjacent a desired numeral 39, the same number in the form of a raised indicia 35 is moved into printing position adjacent the underside of the journal tape 19 by the associated print rack 31. Thus the print racks 31 move laterally relative to the chosen longitudinal axis of the tape 19.

The journal tape 19 is selected to be of the type of pressure-sensitive paper having encapsulated nodules of ink which burst in controlled and limited fashion under the application of pressure to record the pattern of the particular adjacent raised indicia 35. Such paper is commercially available, one example being so-called "Action" paper sold by the 3M Company. However, media such as carbon paper, dual layer paper or an inked ribbon similar to conventional typewriter ribbon can also be used to provide the indications on the journal tape 19 at the sacrifice of some simplicity and external readability. Pressure is applied to the opposite side of the journal tape 19 from the raised indicia 35 by an imprint wheel assembly 41 which includes a handle 43 and a rotatably mounted imprint wheel 45. The imprint wheel assembly 41 is slidably mounted on the housing 11, being laterally restrained by a pair of imprint assembly guides 47 containing slots 49 which are engaged by pins 51 mounted to a central lower portion of the imprint wheel assembly. As the imprint wheel assembly 41 is drawn across the top of the housing 11 by the handle 43, the imprint wheel 45 presses the journal tape 19 against the raised indicia 35, recording the particular indicia thereon in a form which can be read visually and also automatically by a tape reader as will become more fully apparent from the discussion below.

The drive band 29 has a portion positioned across the top of the recorder substantially parallel to the tape 19 longitudinal axis and over a pin 53 mounted in an aperture 55 within the imprint wheel assembly 41. The drive band 29 is supported by band spindles 56 and pivotably mounted band rollers 57 (only one each of the spindles 56 and rollers 57 being shown in FIG. 2). The pin 53 is located at one end of the aperture 55 remote from a beveled edge 58 at the bottom surface of the imprint wheel assembly 41. This edge 58 is pivoted, depending upon the direction of movement of the handle 43. When the imprint wheel assembly 41 is drawn in a direction from left to right (in FIG. 1) to imprint the journal tape 19, the force on the handle 43 raises the beveled edge 58 above the imprint assembly guides 47, allowing the slackened band 29 to slide through the aperture 55 and remain stationary as the imprint wheel assembly is advanced. Should friction develop between the band 29 and the aperture 55 or the pin 53 to an extent sufficient to move the band during imprinting, the sprag clutch assembly 27 disengages from the takeup reel 25 leaving the journal tape 19 unaffected. When the imprint wheel assembly 41 is returned in a direction from right to left however, the handle 43 and imprint wheel assembly pivot about the pins 51 until the beveled edge 58 rests on the imprint assembly guides 47. This pivoting action causes the pin 53 to lift against the drive band 29 tightening the band and engaging with it to move it with the imprint wheel assembly 41. The tightened position of the drive band 29 is shown in dotted outline in FIG. 4. The movement of the drive band 29 is in a direction to turn the sprag clutch assembly 27 and advance the imprinted portion of the journal tape 19 across the top of the housing 11 and onto the takeup reel 25. In this manner, the endless drive band 29 in conjunction with the sprag clutch assembly 27 and the imprint wheel assembly 41 sequentially advances the journal tape 19 in increments. The length of the increments varies within a limited range, dependent upon the amount of tape on the takeup reel 25. Furthermore, imprinting and advancing of the journal tape 19 are both accomplished by a single manipulation of the imprint wheel assembly 41.

In accordance with the particular transaction being recorded, additional forms may be imprinted by the recorder as necessary. As shown in FIGS. 1 and 2, a sales slip 59 consisting of an original and as many copies as are required is positioned between the journal tape 19 and the imprint wheel 45 by a slip guide 61. The sales slip 59 and copies are pressure-sensitive papers of the carbon copy or non-carbon copy type. The sales slip 59 is jointly imprinted with the journal tape 19 by the imprint wheel assembly 41. After imprinting, the sales slip 59 is readily removed and a different slip inserted into the slip guide 61 for the next transaction. For credit transactions, a credit card 63 having an embossed portion containing information such as the customer's name, address, and account number, is inserted into a card guide 65 under the journal tape 19 and the sales slip 59 with the raised side of the embossed portion being along the previously defined longitudinal axis. Movement of the imprint wheel assembly 41 imprints the embossed information from the credit card 63 onto both the sales slip 59 and the journal tape 19. Thus, by a single manipulation of the imprint wheel assembly 41, a transaction is completed and certified on the journal tape 19 without the need for handwriting. Furthermore, since the characters on the tape 19 are visually readable, a clerk and a customer can both verify the information as it appears on the journal tape 19 and sales slip 59 if the sales slip is removed before advancing the tape.

This arrangement has a number of particular advantages from the standpoint of operator and system usage. Although the variable input data has been represented only in terms of embossed cards and movable control buttons for convenience, it will be evident that separate control buttons can be made available for insertion of account number and other information. Similarly, the imprint mechanism may include what may be termed fixed data, such as station, clerk or date information, by means of key set mechanisms or internal type faces.

The disposition of the embossed card relative to the type faces shown in FIG. 1 is particularly useful, because the completed journal tape would normally be read in the reverse direction, so that the account number would be provided first and the remaining sales information subsequently. It is further evident that the writing area provided for the sales personnel on the upper panel of the transaction recorder could be substantially expanded for the manual insertion of data supplementary to the printed information.

The possible combinations of printed forms which can be used with the transaction recorder are virtually unlimited. For example, if a receipt is to be provided only with occasional transactions, a separate receipt form may be inserted with the sales slip 59 into the slip guide 61. If a receipt is to be provided with every transaction, a roll of paper may be mounted to be fed with the journal tape 19, and the imprinted end of the roll is torn off after each recordation and given as the receipt.

For supplying the imprinted data on the journal tape 19 to data processing equipment, the imprinted characters are scanned photoelectrically along the two longitudinal axes relative to the tape 19. Imprinting in the chosen type font is scanned at a constant speed along two lines parallel to the length of the tape, with a pulse being generated each time one of the two lines crosses a printed line on the tape. The characters are represented by the previously mentioned unique code combinations of electrical pulses which can be fed directly into data processing equipment without the need for hand conversion such as by reading the journal tape or the sales slip and key punching a card accordingly. Because only two positions are scanned by movement of the tape, and because digital signals are provided, the tape reader is relatively small and inexpensive when compared with the usual optical reading, card punch, or card reader equipment. Therefore, where the volume of business warrants, each transaction recorder can be equipped with a tape reader which is directly linked via communication lines such as in an "on-line" coupling to a data processing center. The reader device is not restricted to the above form, however. Other well-known optical character fonts may also be printed and read, and with sufficiently versatile equipment different fonts may be intermixed.

Figure 5:
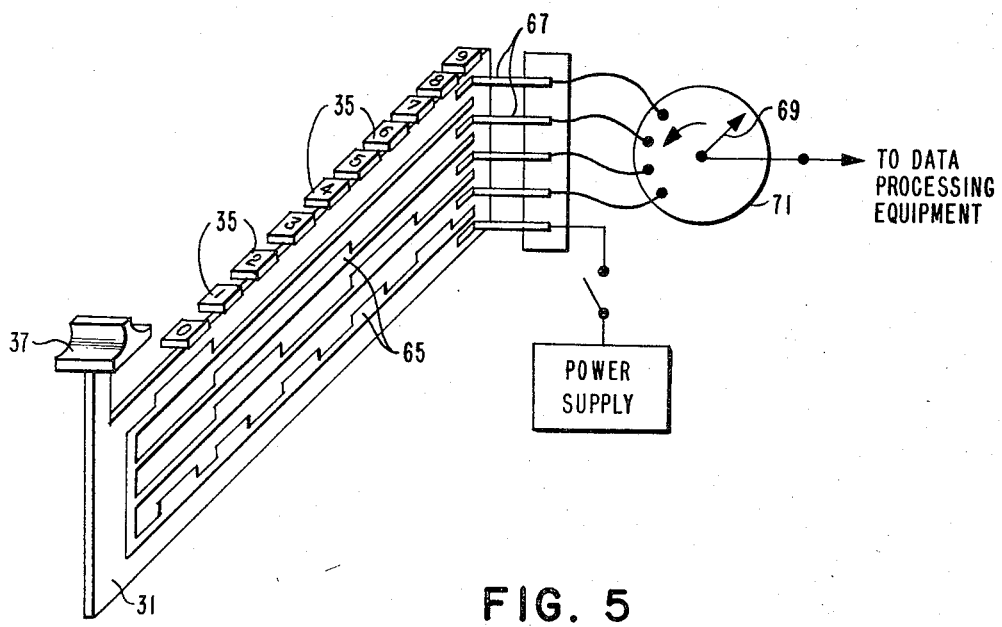
FIGURE 5 is a schematic showing of a print rack and a commutator arrangement for generating electrical signals representing various indicia in accordance with the invention.
Figure 4:
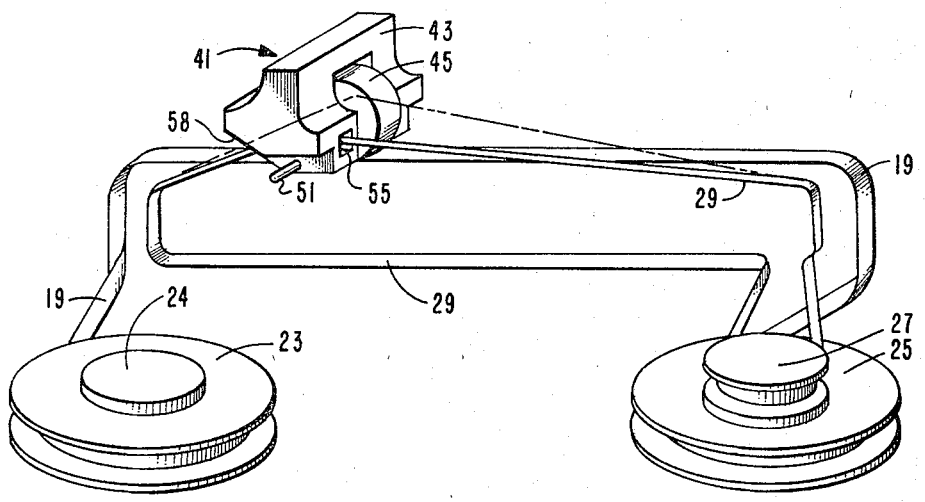
FIGURE 4 is a schematic showing of tape and band assemblies used for drive purposes in the transaction recorder of FIGS. 1 and 2.

The transaction can also operate on-line without a tape reader. An arrangement for generating an electrical signal representing the particular raised indicia 35 positioned adjacent the journal tape 19 is shown in FIG. 5. Each print rack 31 includes a coded array of conductors 65 which are appropriately arranged to make contact with certain ones of a plurality of fixed brushes 67 mounted at a selected point within the recorder. With the print rack 31 adjusted to position a desired indicia 35 adjacent the journal tape 19, the contacts established between the brushes 67 and the coded array of conductors 65 correspond to the desired indicia. Upon imprinting the journal tape 19, the wiper arm 69 of a commutator 71 sequentially sweeps a plurality of terminals connected to the brushes 67 generating a coded digital signal corresponding to the imprinted indicia, which signal is fed directly into data processing equipment.

While the particular transaction recorder described has not been designed to perform calculations, it can be easily modified to do so by adding a set of accumulator wheels in conjunction with the print racks 31. Windows may be positioned adjacent each print rack 31 in the top of the housing 11 making each subtotal visible. The act of imprinting with the imprint wheel assembly 41 performs the mechanical "carry" function during the subtotaling of each item, while the completion of the subtotal resets the accumulator wheels so that "carry" does not occur until the next transaction.

A separate control button 75 and internal print rack is included in the recorder to provide further versatility. This button 75 and print rack print identification symbols for visible tape reading to separately categorize "item," "tax," and "total" in this example. Thus a tape reader scanning the journal tape 19 is able to identify the various parts of the imprinted data for a complete transaction. The separate information is recorded on the journal tape even though the customer record may include only a part of the information. If desired, a cash drawer may be added to the recorder. With the drawer linked to the "total" print rack, the drawer can be opened automatically after each transaction is totaled in a manner similar to a cash register.

A number of additional features may also be provided, if desired. The print racks and control button mechanisms may be arranged to be responsive to the movement of the imprint mechanism, so that after imprinting the control buttons are returned to the zero position as the journal tape is advanced. If desired, an electrical drive may be utilized for the imprint wheel mechanism. Furthermore, provision may be made for increasing the number of characters available to the print racks, by mechanical systems permitting substantial compaction of the characters.

Although there has ben described a specific arrangement of a transaction recorder in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A transaction recorder comprising: means providing a journal tape of presure-sensitive imprint paper disposed to move longitudinally along an axis; print rack means disposed along the axis and manually movable laterally relative to the axis, and including type face charactecs of a form which is both visually readable and machine readable disposed with a height direction normal to the axis and being readable in the direction of the axis; means for positioning at least one unit media record member of pressure sensitive paper against the side of the tape opposite the type face characters of the print rack means; and imprint means manually movable along the axis and urging said journal tape and said at least one unit media record member against said type face characters.

2. A transaction recorder comprising: means providing a journal tape of pressure-sensitive imprint paper containing encapsulated nodules of fluid of a different color than the paper disposed to move longitudinally along an axis; embossed card receiver means disposed along the axis in a first region thereof; print rack means disposed along the axis and movable laterally relative to the axis in a second region thereof and including type faces each representing a different decimal digit of visually readable form, each of the digits varying in a particular binary fashion along the axis at two lateral positions and a number of positions longitudinally relative to the axis so as to be readable by optical sensing means in accordance with a predetermined code, said card receiver means and print rack means being disposed on the same side of said journal tape; imprint means mechanically imprinting said tape against an inserted card in said card receiver, and against said type faces; means for advancing said journal tape in response to the movement of said imprint means; and means for visually verifying the imprinted tape prior to its advancement.

3. The invention as set forth in claim 2 above, wherein said recorder additionally includes means for receiving a unit media record member superimposed on said journal tape; and wherein said imprint means is manually movable longitudinally along said axis from and back to a start position across said first and second regions; and wherein said means for advancing is responsive to the movement of said imprint means and advances said journal tape in incremental amounts during the return movement of said imprint means to the start position.

4. The invention as set forth in claim 3 above, wherein said recorder further includes rotatable tape takeup means, and wherein said means for advancing further comprises endless drive tape means coupled to said tape takeup means, and means for selectively coupling said drive tape means to said imprint means during the return movement.

5. In a transaction recorder wherein raised characters on selectively movable indicia means are imprinted on a pressure-sensitive journal tape by longitudinal movement of an imprint device along the longitudinal axis of the journal tape from and back to a start position, a system for advancing said journal tape comprising an endless drive band having a portion parallel and adjacent to the path of said imprint device; supply and takeup means for said journal tape; said endless drive band being mechanically coupled to said takeup means; and means responsive to the direction of movement of said imprint device for engaging said imprint device to said endless drive band during the return movement thereof; thereby to couple said drive band to said takeup means to advance said journal tape a corresponding amount.

6. A transaction recorder including the combination of a length of pressure-sensitive member, a plurality of print racks spaced apart along the length of the pressure-sensitive member, each having a plurality of raised indicia and slidable along an axis substantially normal to the longitudinal axis of the member to position a selected one of the plurality of raised indicia adjacent one side of the member, said raised indicia comprising print which is both visually readable and readable by optical sensing means, movable means for applying pressure to the opposite side of the member from said raised indicia, and means responsive to the operation of said movable means for advancing said member.

7. The transaction recorder of claim 6 further including means for positioning at least one pressure-sensitive unit media record member adjacent the member and the movable means for applying pressure.

8. The transaction recorder of claim 6 wherein the pressure-sensitive member includes encapsulated ink nodules.

9. The transaction recorder of claim 6 wherein said means for advancing said member sequentially advances said member in increments.

10. A transaction recorder including the combination of a length of pressure-sensitive imprint tape, print rack means providing visible indicia and slidably mounted to position any one of the indicia adjacent one side of the tape, the height direction of said indicia being normal to the length of the tape and the indicia being visually and machine readable, and an imprint wheel assembly including a rotatably mounted wheel, said imprint wheel assembly being movable to roll the wheel along the side of the tape opposite the indicia thereby applying pressure to the tape, for providing on the tape an indication of those indicia adjacent the tape.

11. The transaction recorder of claim 10 further including means responsive to the movement of the imprint wheel assembly for sequentially advancing increments of the length of tape through a selected printing position adjacent said print rack means.

12. The transaction recorder of claim 10 further including a rotatably mounted reel onto which one end of the length of tape is wound, clutch means coupled to the reel and adapted to engage the reel when driven in one direction and disengage the reel when driven in the opposite direction, and a continuous drive band coupled to drive the clutch in either direction when moved, said band being engaged by and moved with the imprint wheel assembly in at least one direction of movement thereof.

13. The transaction recorder of claim 10 further including means coupled to the print rack means for generating electrical signals representing the particular indicia positioned adjacent the tape.

14. The transaction recorder of claim 13 wherein the means for generating signals comprises a plurality of electrical conductors arranged in a coded array and coupled to the print rack means, a plurality of electrical brushes positioned adjacent the electrical conductors and making contact with appropriate ones of the conductors corresponding to the particular one of the indicia adjacent the tape, and a commutator having a plurality of contacts connected to the brushes and a wiper arm for sweeping the commutator contacts and generating a coded signal representing the indicia adjacent the tape.

15. A transaction recorder comprising: means providing a journal tape of pressure-sensitive imprint paper disposed to move longitudinally along an axis;
embossed card receiver means, disposed along the axis in a first region thereof;
print rack means disposed along the axis and movable laterally relative to the axis in a second region thereof and including type face each representing a different decimal digit of readable form, the digits varying uniquely in binary fashion along the axis at two lateral positions in a number of positions longitudinally relative to the axis;
means for receiving a unit media record member superimposed on said journal tape;
said card receiver means and print rack means being disposed on the same side of said journal tape;
imprint means mechanically imprinting said tape against an inserted card in said card receiver, and against said type faces;
said imprint means moving longitudinally along said axis from and back to a start position across said first and second regions;
rotatable tape takeup means;
and means for advancing said journal tape in incremental amounts in response to the return movement of said imprint means to the start position;
said means for advancing comprising endless drive tape means coupled to said tape takeup means, and means for selectively coupling said drive tape means to said imprint means during the return movement; and
said imprint means comprising a pair of longitudinal guides, a pivotally mounted handle element and a pressure roller, the handle element including a beveled portion including a pair of surfaces, said handle element resting on and moving along said guides, a first surface of said beveled portion being in engagement with said guides during movement from the start position, the second surface being in engagement with said guides during return movement to said start position, and pin means coupled to said handle element for frictionally engaging said drive band means during the return movement.

16. A transaction recorder comprising:
means providing a journal tape of pressure-sensitive imprint paper disposed to move longitudinally along an axis;
means for receiving at least one unit media record member superimposed on said journal tape;
at least one print rack comprising an integral member which includes a plurality of raised indicia and which is manually slidable laterally relative to the tape axis to position a selected one of the indicia adjacent the side of the tape opposite the unit media record member, each of said indicia comprising a form which is visually readable and which varies in predetermined fashion along parallel axes in the direction of the tape axis so as to be machine readable; and
imprint means manually movable along the tape axis to apply pressure directly to the side of the unit media record member and tape thereby urging the member and tape against the selected one of the indicia.

17. The invention as set forth in claim 16 above, further including embossed car receiver means disposed along the tape axis on the same side of the tape as the print rack, said imprint means mechanically imprinting the tape and record member against an inserted card in the card receiver.

References Cited

UNITED STATES PATENTS

| | | | |
|---|---|---|---|
| 2,548,366 | 4/1951 | Green et al. | 101—426 X |
| 2,582,187 | 1/1952 | Wolowitz | 101—90 |
| 2,647,459 | 4/1953 | Murphy | 101—90 |
| 2,712,507 | 7/1955 | Green | 101—426 X |
| 3,083,641 | 5/1963 | Childs et al. | 101—269 |
| 2,791,310 | 5/1957 | Jones | 101—369 X |
| 3,138,091 | 6/1964 | Maul | 101—45 |
| 3,163,107 | 12/1964 | Sumida et al. | 101—90 |
| 3,183,834 | 5/1965 | Marmor et al. | 101—260 |
| 3,207,069 | 9/1965 | Sumida | 101—32 |
| 3,279,369 | 10/1966 | Wright | 101—269 |

WILLIAM B. PENN, *Primary Examiner.*